F. W. CONANT.
DIE.
APPLICATION FILED MAY 24, 1920.
1,399,932.
Patented Dec. 13, 1921.
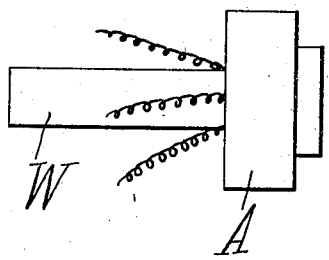
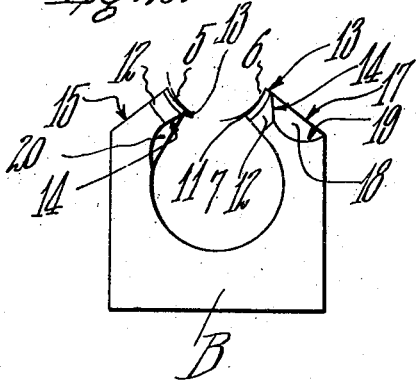
INVENTOR
Frederick W. Conant.
BY Chapin & Neal
ATTORNEYS.

UNITED STATES PATENT OFFICE.

FREDERICK W. CONANT, OF CONWAY, MASSACHUSETTS.

DIE.

1,399,932.    Specification of Letters Patent.    Patented Dec. 13, 1921.

Application filed May 24, 1920. Serial No. 383,821.

*To all whom it may concern:*

Be it known that I, FREDERICK W. CONANT, a citizen of the United States, residing at Conway, in the county of Franklin and State of Massachusetts, have invented new and useful Improvements in Dies, of which the following is a specification.

This invention relates to improvements in dies or similar thread cutting tools.

The invention is directed generally to the prevention of clogging of the clearance openings of the die and to the production of work of improved quality. With ordinary dies, the chips, which always start to curl, leave the work at right angles to its axis. Such chips either curl upon themselves or soon encounter obstructions, which cause them to break and the practical result is a succession of short chips which tend to adhere to the die in its clearance openings and, by their accumulation, soon clog such openings. As distinguished from the usual operation, my die is designed to cut with a shearing or drawing cut, which necessarily produces smoother and more cleanly cut threads by cutting into the work gradually and progressively rather than digging in simultaneously at a plurality of points. More important, however, is the fact that the curling chips leave the work at an acute angle to its axis and at such an angle as to be deflected outwardly from the die through the clearance openings. The chips are so directed that they are allowed to curl in helices of coarse pitch, and so that such helices pass out of the die without encountering obstructions, such as would break them, thereby leaving the clearance openings free from the usual accumulations.

The broad object of my invention is to provide a die or the like, which has the cutting edge of the usual relieved or cutting section of the die so fashioned as to cut by a shearing or drawing action.

More particularly, it is an object of the invention to so form the relieved or cutting portion of the die, or the like, that that plane, in which the cutting edge of such portion lies, is disposed at an acute angle to the axis of the work and so as to deflect the chips outwardly from the die through its clearance openings.

Other objects and advantages will appear in the following description and in the illustrative embodiment of the invention in the accompanying drawings, in which:

Figure 1 is an elevational view of a die, embodying the invention and shown as in the act of threading a piece of work;

Fig. 2 is a bottom plan view of one of the dies;

Fig. 3 is an elevational view of the die shown in Fig. 2; and

Fig. 4 is a sectional plan view taken through the die holder above its center line to illustrate the disposition of the cutting edge relatively to the work.

Referring to these drawings; A represents a suitable die holder in which are contained a number, as two, die members B, which are suitably held therein, as by the member C. Each member B, as shown, has in reality two distinct die elements, as indicated at 5 and 6, with an opening 7 between them for the reception of chips. Between adjacent die members B, as mounted in the holder A, are other openings, one of which is shown at 8 in Fig. 4, also for the reception of chips. Each die element, as 6, is formed in the usual manner with guiding or leading teeth, as 9, and with cutting teeth, as 10, which are relieved, as at 11, to provide clearance, as is usual. The die is also tapered as at 12, to form the usual converging entrance, which constitutes the cutting or relieved portion of the die. The die thus far described is of the common well-known construction.

This invention is concerned particularly with the cutting portion of the die and particularly with the disposition of the cutting edge of such portion. The cutting edge of the main part of the die is indicated at 13 and that of the cutting portion at 14. Ordinarily, both these edges 13 and 14 lie in the same plane. This will be apparent by considering the corresponding rear edges of the die, which lie in a common plane 15, even though the edge of the cutting portion is tapered, as described, to form the cutting portion. The cutting edges 13 and 14 not only lie in the same plane, but such plane is parallel with the axis of the work, as W, which is being threaded. This will be apparent from Fig. 4, in connection with the plane 15, already alluded to as including the rear edges of both the cutting and guiding portions of the die. Such rear edges are mentioned, not for any particular novelty, but rather because they truly represent the conditions of the front or cutting edges of the usual die. The plane surface 15 at the rear edge of the die is like the plane surface 17 at the front edge of the die and, but for the recessing of the surface 17, as at 18, in a manner to be described, both edges 13 and 14 would lie in the same plane as the surface 17.

The die of this invention is produced by taking any ordinary die, or other thread cutting tool, and recessing it in a manner generally similar to what is shown at 18. That is, the surface 17, adjacent the cutting portion of the die, is ground, or otherwise cut away at an acute angle to the plane of surface 17. The recessing is deepest at the entrance end of the die and tapers progressively toward the opposite end of the die until the surface 19, formed by this recessing, merges into the surface 17. Thus, there is a surface 19 in addition to the usual surface 12 which is tapered or inclined relatively to the rest of the die. These two inclined surfaces 12 and 19 intersect and the line of intersection, which naturally must lie in another plane than that of surface 17, is the cutting edge 14, above referred to.

The cutting edge 14 thus lies in a plane which is inclined at an acute angle to the axis of the work being threaded, as is clearly shown in Fig. 4. This disposition of the edge 14 with relation to the work W makes possible the cutting of the work with a shearing or drawing cut as distinguished from the usual cut, obtained by holding the cutting edge at right angles with the direction of its travel. The beneficial effects of a drawing cut, as far as improved smoothness of the surfaces formed by the cutting, are well-known and, in this instance, the threads are much smoother than ordinarily is the case.

In cutting the work, the material removed always tends to curl and the axis about which the material curls is parallel to the cutting edge. With such edge parallel to the axis of the work, the chip produced tends to form like a spiral with all its convolutions in the same plane. Such a chip soon breaks and some of the broken parts remain in the clearance openings 7 and 8, adhering to the walls thereof by reason of the oil or other lubricant used in the threading operation. The chip thus breaks because it rolls upon itself always substantially in the same plane or because it strikes an obstruction in the character of some adjacent surface. With the drawing cut, however, the chip, instead of being more like a spiral, is a pronounced helix, as represented in the drawing. That is, it travels axially as well as in a circular direction and its convolutions, being disposed in different planes, do not engage each other and cause breakage of the chip. In this connection, the recessing at 18 is preferably done in a manner to make the surface 19 so curved as to present no obstruction to the rolling of the chip.

Thus, each chip will travel in a helical path in the recess 18 and parallel to the edge 14 and thus at an inclination to the axis of the work. The chips thus leave the die in continuous strings rather than breaking therein. The breaking of the chips, at least for the most part, occurs outside the die and the broken parts drop to the floor rather than clogging the die.

The die 5 is recessed at 20 in a manner similar to the recessing at 18 in connection with die 6 and for a like purpose.

It is recognized that the chips formed in a thread cutting operation will not be true spirals on account of the helical nature of the cut. They will have some "lead" corresponding substantially to the "lead" of the thread being cut. Such "lead," however, is relatively small as compared to that in the present case, which is produced by reason of the angular disposition of the cutting edge 14 relatively to the axis of the work. The usual chip with the slight lead has the axis of its helix parallel with the axis of the work and soon breaks and almost invariably breaks within the die. The comparison between the spiral and helical nature of the chips, while not strictly correct, is nearly enough so for all practical purposes and is the best analogy that can be made between the chips formed by the usual and by the present style of die.

Thus, I have provided an improvement in thread cutting tools which results not only in improved quality of work, but also in the substantial elimination of the difficulties heretofore experienced with clogging of the clearance openings.

The invention has been disclosed herein, in an embodiment at present preferred, for illustrative purposes, but the scope of the invention is defined by the appended claims rather than by the foregoing description.

What I claim is—

1. A thread cutting device, having cutting and leading portions and having the cutting edge of the cutting portion formed by the intersection of two planes, each of which is inclined at an acute angle to the axis of the work to be cut.

2. A thread cutting device, having cutting and leading portions with cutting edges for each, said cutting edges being disposed in different planes and the cutting edge of the cutting portion lying in a plane which is inclined at an acute angle to the axis of the work to be cut.

3. A thread cutting device, having the usual leading portion and a tapering portion at the entrance end of the die to form the usual cutting portion, and a second tapered portion substantially at right angles to the first tapered portion and intersecting therewith, the intersection of said tapered portions constituting the cutting edge of the cutting portion.

In testimony whereof I have affixed my signature.

FREDERICK W. CONANT.